United States Patent [19]

Mouldin et al.

[11] Patent Number: 5,231,400
[45] Date of Patent: Jul. 27, 1993

[54] COVERT ELECTRONIC BATTLEFIELD IDENTIFICATION SYSTEM

[75] Inventors: Richard B. Mouldin, Park City; Richard J. Saggio, Salt Lake City, both of Utah

[73] Assignee: Unisys Corporation, Blue Bell, Pa.

[21] Appl. No.: 883,621

[22] Filed: May 12, 1992

[51] Int. Cl.$^5$ .............................................. G01S 13/78
[52] U.S. Cl. ........................................................ 342/45
[58] Field of Search .................. 342/45, 44, 42, 50, 342/51

[56] References Cited

U.S. PATENT DOCUMENTS

| | | | |
|---|---|---|---|
| 4,075,632 | 2/1978 | Baldwin et al. | 342/51 |
| 4,144,534 | 3/1979 | Prickett et al. | 342/43 |
| 4,694,297 | 9/1987 | Sewards | 342/45 |
| 4,837,575 | 6/1989 | Conner, Jr. | 342/45 |
| 5,001,488 | 3/1991 | Joguet | 342/45 |
| 5,144,313 | 9/1992 | Kirknes | 342/44 |

Primary Examiner—John B. Sotomayor
Attorney, Agent, or Firm—Charles J. Fassbender; Mark T. Starr

[57] ABSTRACT

An electronic identification system for use by vehicles on a battlefield comprises an interrogator circuit in an attack vehicle and a transponder circuit in several other vehicles which are friendly but could be mistaken for the enemy. In operation, the interrogator circuit transmits a time shifted code which is very difficult for an actual enemy to detect and/or jam, and which causes the transponder circuits to send a response from only a selected one of the other friendly vehicles that is being examined by the attack vehicle as a target.

10 Claims, 4 Drawing Sheets

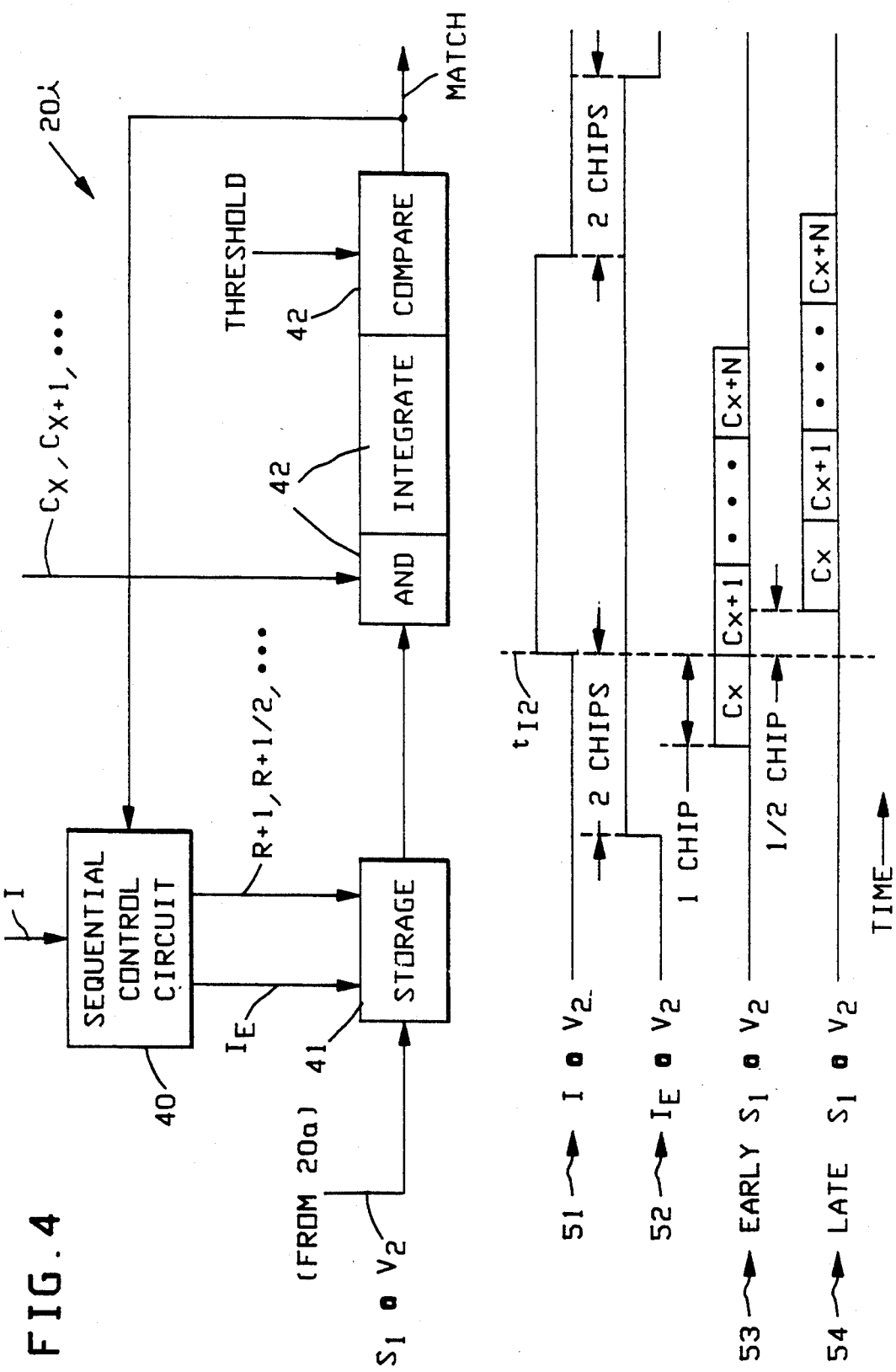

COVERT ELECTRONIC BATTLEFIELD IDENTIFICATION SYSTEM

BACKGROUND OF THE INVENTION

Casualties due to "friendly fire" have been an unfortunate element of warfare throughout history. Often, such casualties occur because the technology to identify a potential target as friendly under the fog of war has not always kept pace with the technology to acquire that target and destroy it.

In Operation DESERT STORM, a simple apparatus was used to identify friendly vehicles. This apparatus, installed in each friendly vehicle, merely emitted an infra-red beacon. Unfortunately, such a beacon will also serve to positively identify the vehicle to a moderately sophisticated enemy. What is needed is an electronic identification system which determines whether or not a "target" is friendly without bringing either the targeting vehicle or the target vehicle to the attention of the enemy.

BRIEF SUMMARY OF THE INVENTION

In accordance with the present invention, an electronic identification system for use on a battlefield, comprises an interrogator circuit in a targeting vehicle and a respective transponder circuit in each of several friendly target vehicles. Each of the interrogator and transponder circuits includes a code generator which generates the same sequence of chip signals, and they include a timing circuit which generates synchronized reference timing signals. Also, the interrogator circuit further includes—1) a range finding circuit which determines the propagation time for a radio signal to travel from the interrogator circuit to a selectable one of the friendly target vehicles, and, 2) a transmitting circuit which transmits via radio the sequence of chip signals advanced in time relative to the reference timing signals by the propagation time. In addition, the transponder circuit includes—1) a correlator circuit for receiving the transmitted chip signals in synchronization with the reference timing signals and for correlating same with the sequence of chip signals from its own code generator, and 2) a response circuit for transmitting via radio a response only if the result of the correlating operation exceeds a certain threshold.

DETAILED DESCRIPTION

Figure 1:
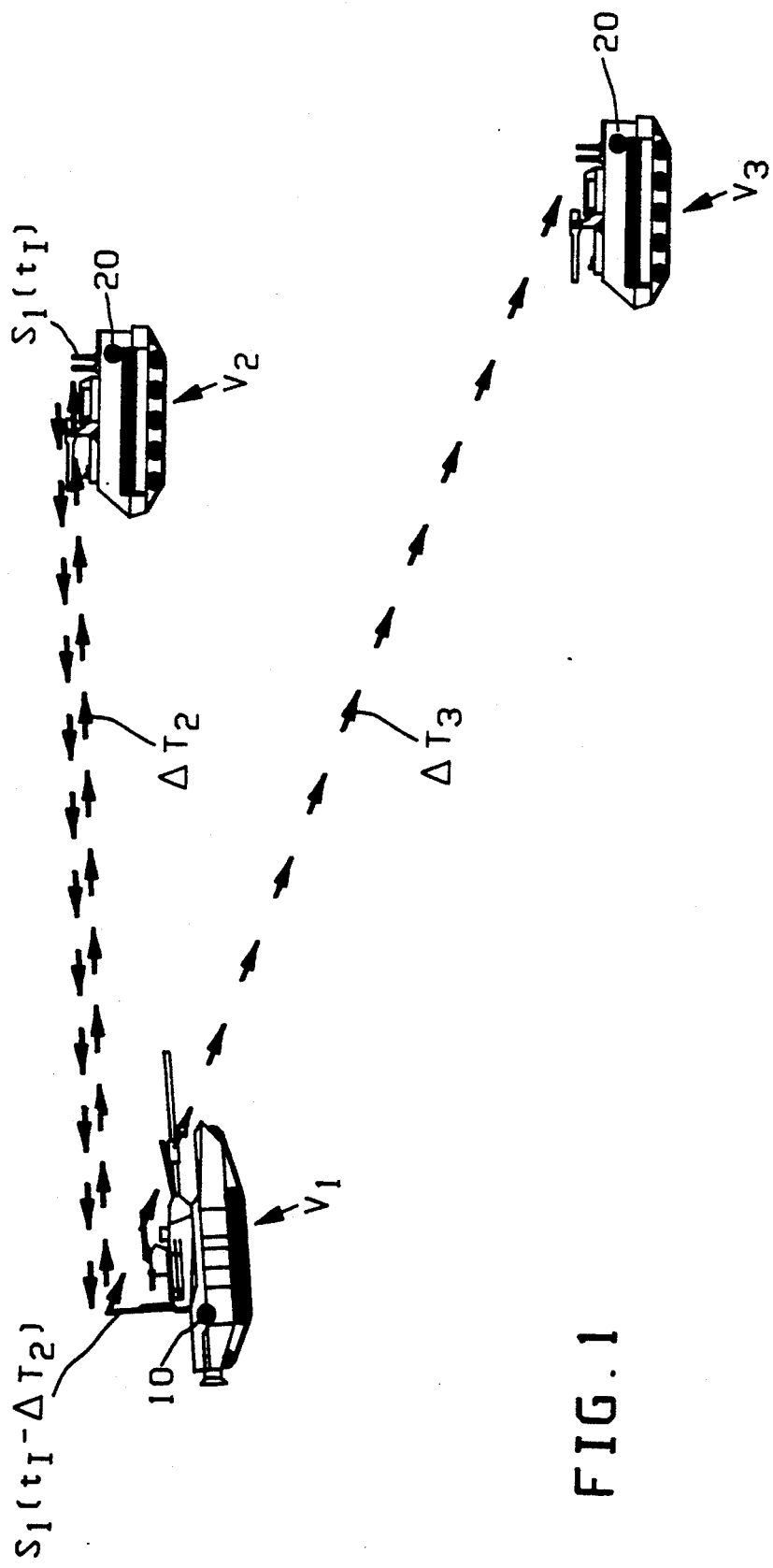
FIG. 1 shows three battlefield vehicles which incorporate a preferred embodiment of an electronic identification system that is structured and operates in accordance with the present invention.
Figure 2:
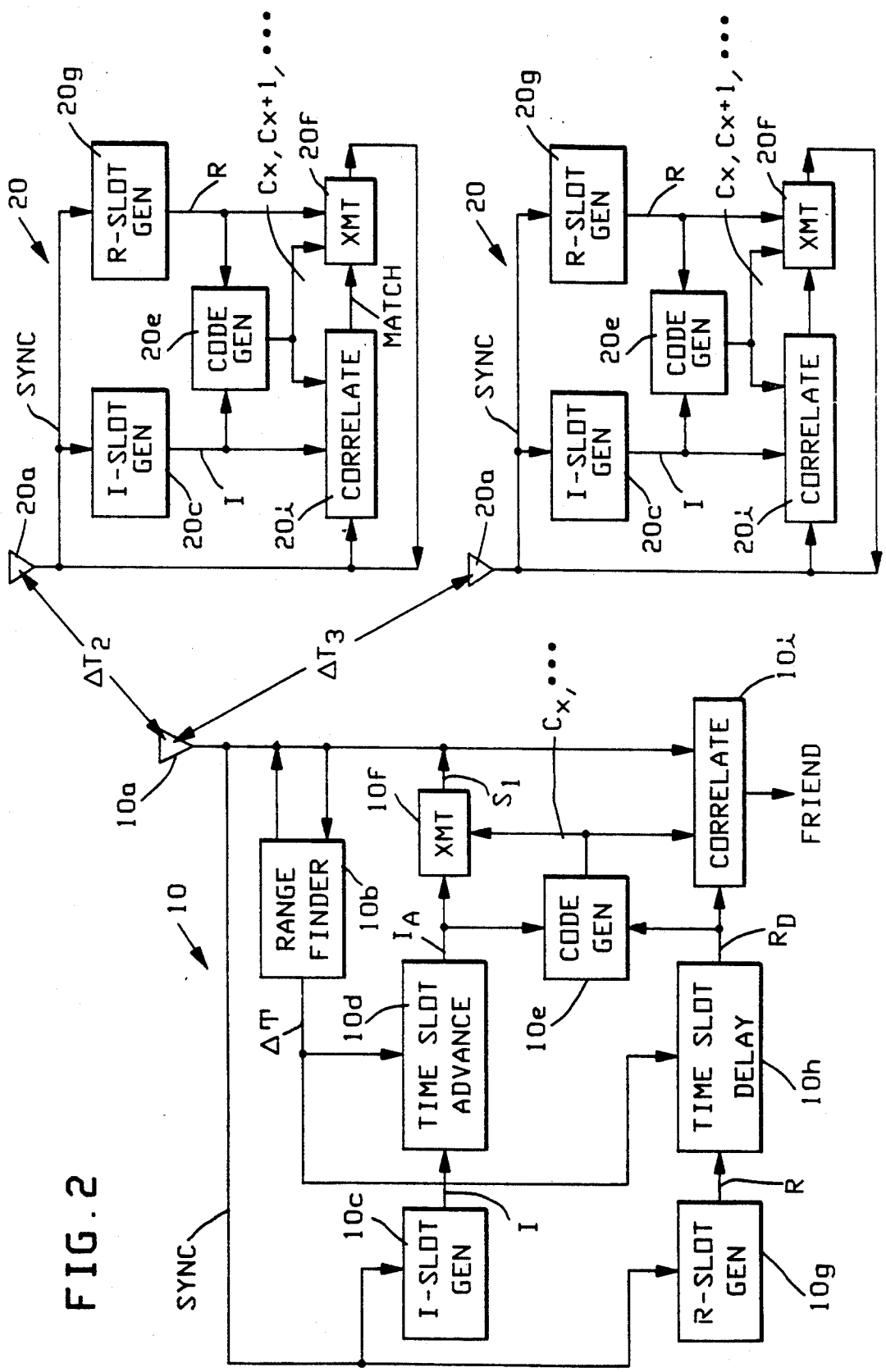
FIG. 2 shows the structure of an interrogator circuit and the transponder circuit which comprise the identification system of FIG. 1.
Figure 3:
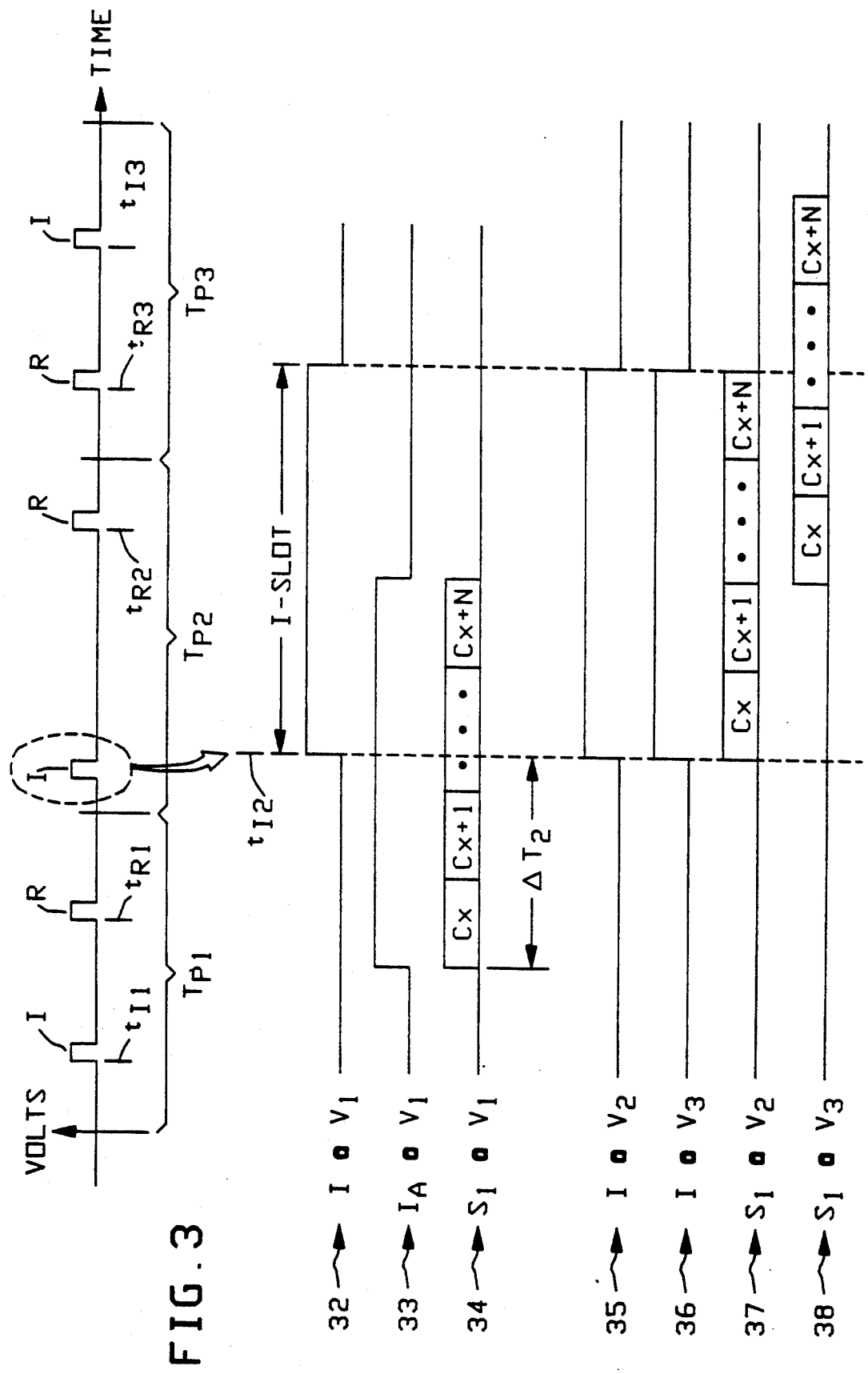
FIG. 3 is a set of signal waveforms which illustrate the operation of the FIG. 2 circuits; and, FIG. 4 shows the structure and operation of a preferred correlator for the transponder of FIG. 2.

Referring now to FIG. 1, it shows three battlefield vehicles $V_1$, $V_2$, and $V_3$ which incorporate an electronic identification system in accordance with the present invention. This electronic identification system includes an interrogator circuit 10 in vehicle 1 and a transponder circuit 20 in each of the vehicles $V_2$ and $V_3$. All of the structural details of the interrogator circuit 10 and the transponder circuit 20 are shown in FIG. 2, and the signals and operational details of those circuits is shown in FIG. 3.

In operation, the interrogator circuit 10 and the transponder circuits 20 enable an operator of vehicle $V_1$ to select any one of the vehicles $V_2$ or $V_3$ and electronically determine if the selected vehicle is friendly or belongs to an enemy. Such a determination is needed in order to prevent the vehicle $V_1$ from firing upon and destroying a friendly vehicle by mistake. With the identification system of FIG. 1, the distinguishing of a friendly vehicle from an enemy vehicle is achieved by the circuits 10 and 20 as follows.

First the operator of vehicle $V_1$ selects one of the vehicles $V_2$ or $V_3$ as a potential target. Assume for example that vehicle $V_2$ is selected. Then, the transponder circuit 10 transmits a radar type signal and measures the propagation time for the signal to travel from the interrogator circuit 10 to the selected vehicle $V_2$. This propagation time in FIG. 1 is shown as $\Delta T_2$. Vehicles $V_2$ and $V_3$ are at different distances from vehicle $V_1$, and thus the propagation time for the signal to travel to vehicle $V_3$ will be different. That propagation time is shown in FIG. 1 as $\Delta T_3$.

Next, the interrogator circuit 10 transmits a sequence of chip signals that are advanced in time, relative to an interrogate timing instant $t_I$, by the propagation time $\Delta T_2$. This chip sequence at vehicle $V_1$ is shown as signal $S_1 (t_I - \Delta T_2)$. Then, the chip sequence travels to both of the vehicles $V_2$ and $V_3$; however, due to their different distances from vehicle $V_1$, the chip sequence reaches the vehicles $V_2$ and $V_3$ at different times.

More specifically, the transmitted chip sequence starts to reach vehicle $V_2$ at the interrogate time instant $t_I$, whereas it starts to reach vehicle $V_3$ at some other time. Then, starting at the interrogate time instant $t_I$, the transponder circuit 20 in both of the vehicles $V_2$ and $V_3$ performs a correlation between the signal which it receives and the same chip sequence that was transmitted.

If the result of the above correlation exceeds a certain threshold in one of the transponder circuits 20, then that circuit transmits a response signal $S_2 (t_R)$ which begins at a response timing instant $t_R$. This response signal is shown in FIG. 1 as being transmitted from vehicle $V_2$ since in the above example, the transmitted chip sequence $S_1$ was shifted in time by the signal propagation delay between vehicles $V_1$ and $V_2$.

Next, beginning at time instant $t_R + \Delta T_2$, the interrogator circuit 10 performs a correlation operation on whatever radio signal it receives and the expected response signal $S_2$. If that correlation exceeds a certain threshold, the interrogator circuit 10 generates a signal indicating the potential target vehicle is friendly.

Turning now to FIG. 2, the internal structural details of a preferred embodiment of the interrogator circuit 10 and the transponder circuit 20 which operates in the above fashion will be described. This particular embodiment of the interrogator circuit 10 includes an antenna 10a, a range finding circuit 10b, an interrogate timing slot generator (I-slot generator) 10c, a timing slot advance circuit 10d, a code generator 10e, a transmitter circuit 10f, a response timing slot generator (R-slot generator) 10g, a time slot delay circuit 10h, and a correlator circuit 10i. All of these circuits are interconnected as shown.

Initially, the interrogator circuit 10 is started by a synchronizing signal SYNC that is received via the antenna 10a from an external source. Suitably, the synchronizing signal comes from a satellite such as the global positioning satellite GPS. That synchronizing signal SYNC is then sent to the I-slot generator 10c and the R slot generator 10g, whereupon they respectively begin generating a series of interrogate timing signals I and response timing signals R. These timing signals I and R are shown in FIG. 3 as voltage waveform 31.

Waveform 31 is made up of a series of consecutive time periods $T_{P1}$, $T_{P2}$, etc.; and, within each time period, a single pulse of the I signal and a single pulse of the R signal occurs. Also, within each of the time periods $T_P$, the I pulse and the R pulse begin at different time instants which vary in a quasi random fashion from one time period to another. These time instants for the I pulse are labeled in FIG. 3 as $T_{I1}$, $T_{I2}$, etc.; and for the R pulse they are labeled as $T_{R1}$, $T_{R2}$, etc.

Each I pulse from circuit 10c is sent to the time slot advance circuit 10d, and each R pulse from circuit 10g is sent to the time slot delay circuit 10h. Those circuits 10d and 10h also receive a signal $\Delta T$ from the range finder 10b which indicates the propagation delay of a radio signal from the interrogator vehicle $V_1$ to the selected target $V_2$ or $V_3$. In response to the signals I and $\Delta T$, circuit 10d generates a timing signal $I_A$ which is the same as the signal I but which is advanced in time by the propagation delay $\Delta T$. This is shown in FIG. 3 by waveforms 32 and 33. Likewise, in response to the signals R and $\Delta T$, circuit 10h generates an output signal $R_D$ which is the same as the signal R but which is delayed in time by $\Delta T$.

Signal $I_A$ is sent to the code generator 10e and to the transmit circuit 10f. Upon receiving the signal $I_A$, the code generator 10e sends a sequence of chip signals $C_x$, $C_{x+1}$, .... to the transmitter circuit 10f. At the same time, the circuit 10f responds to the signal $I_A$ by transmitting the chip signal $C_x$, $C_{x+1}$, via the antenna 10a to the transponder circuits 20. This is shown in FIG. 3 by waveform 34.

In the preferred embodiment of FIG. 2 each of the transponder circuits 20 includes six components which are labeled 20a, 20c, 20e, 20f, 20g, and 20i; and, those components are similar to the components of the interrogator 10 which have the same reference letter. For example, component 20a is an antenna similar to antenna 10a; component 20c is an I-slot generator circuit which is similar to the I-slot generator 10c; component 20e is a code generator that is similar to the code generator 10e; etc. These components 20a, 20c, 20e, 20g, 20i, and 20f are interconnected as shown in FIG. 2.

All of the I-slot generators 20c and the R-slot generators 20g are initialized via a synchronizing signal SYNC that is received via the antenna 20a at the same instant that the interrogator circuit 10 is initialized. Thereafter, the I-slot generator 20c and the R slot generator 20g in both of the transponders 20 generate respective I and R timing signals in synchronization with the I and R signals of the interrogator circuit 10. This is shown in FIG. 3 by voltage waveforms 35 and 36.

Each time the I slot generator 20c generates an I pulse, that pulse is sent to the code generator 20e and to the correlator 20i. In response, the code generator 20e generates the same chip sequence $C_x$, $C_{x+1}$ that was previously transmitted by the interrogator circuit 10; and, the correlator circuit 20i performs a correlation operation between the chip sequence from the code generator 20e and the chip sequence which it receives from the antenna 20a.

If those two chip sequences are in time synchronization with each other, this is detected by the correlator 20i which in turn sends a MATCH signal to the transmitter circuit 20f. Otherwise, no MATCH signal is generated.

In the above example where the interrogator circuit 10 transmits chip sequences that are advanced by $\Delta T_2$ from the timing instants $t_{I1}$, $t_{I2}$, etc., those chip sequences will be received in time synchronization in vehicle $V_2$ with the internally generated chip sequences from code generator 20e. Conversely, in vehicle $V_3$, the received chip sequences will be out of time synchronization with the internally generated chip sequences. This is shown in FIG. 3 by voltage waveforms 37 and 38.

Preferably in the correlator circuit 20i, the received chip sequence from the antenna 20a is correlated with the chip sequence from the code generator 20e during several consecutive I-pulses (e.g.—five to fifteen) before a determination is made to generate the MATCH signal. This correlation, can, for example be performed by circuit 20i by logically ANDing the received chip sequence and the generated chip sequence with each other and integrating the result over several of the I-pulses. Then, when the result of that integration exceeds a certain threshold level, the MATCH signal is generated.

When the match signal is generated, it is sent to the transmitter circuit 20f. That transmitter circuit also receives the R timing signals from circuit 20g along with a sequence of chips from the code generator 20e. Then, in response to the MATCH signal, the transmit circuit 20f transmits via the antenna 20a, the sequence of chip signals from the code generator 20e in time synchronization with the timing signals R.

As the R timing signals are being generated by circuit 20g in the transponder 20, the same R timing signals are being generated by circuit 10g in the interrogator 10. From circuit 10g, the R timing signals are sent to the time delay circuit 10h wherein they are delayed by the time interval $\Delta T$ (i.e. the propagation time for a signal to travel between the vehicles $V_1$ and $V_2$). This delayed timing signal is indicated in FIG. 2 as signal $R_D$.

In time synchronization with signal $R_D$, the code generator 10e generates the same sequence of chips that was previously transmitted by the transponder 20; and, that code sequence is correlated with whatever signals are being received on the antenna 10a. If a MATCH signal was previously generated by a transponder 20, then during the timing signal $R_D$, the signals which are received on the antenna 10a should match the chip sequence from the code generator 10e. In that case, the correlator 10i generates an output signal "FRIEND" indicating that the potential target is a friendly vehicle.

A primary feature of the above described electronic identification system is that its operation is covert and difficult for an enemy to detect. In particular, in order to detect the disclosed system, the enemy must know: 1) the chip sequence $C_x$, $C_{x+1}$... that is being generated by the code generators, 2) the interrogate time instants $T_{I1}$, $T_{I2}$, ... at which the interrogate chip sequences begin, 3) and the response time instants $T_{R1}$, $T_{R2}$, at which the response chip sequences begin.

Also, the disclosed system is made even more difficult to detect by constraining the width of the I and R pulses to be very small relative to the time periods $T_P$. Preferably, each I pulse and each R pulse is less than 10% of the time period $T_P$. As one specific example, the time period $T_P$ can be two milliseconds; the I pulse can be 125 microseconds and include a chip sequence of 4,000 chips; and the R pulse can be 100 microseconds and includes chip sequence of 16,000 chips.

Still another feature of the disclosed system is that its operation requires the use of just a single frequency band. This feature arises because the I pulse and the R pulse start at different time instants; and do not overlap.

Yet another feature of the disclosed system is that it precludes spurious replies to interrogations from all but the one targeted vehicle. This feature results from the fact that the potential target vehicle is identified as being friendly not just on the basis of the code but also on its distance from the interrogator.

Still one additional feature of the disclosed system is that the time which it takes to identify a vehicle as a friend or a foe is quite short. This result occurs because in the vehicle which is the potential target, the chip sequence from the interrogator is timed to reach that vehicle in time synchronization with the vehicle's internal code generator and thus a correlation can be made quickly. Likewise, the interrogator synchronizes the timing of its correlation with the receipt of the response from the potential target. If, for example, each time period $T_P$ is two milliseconds and a correlation is made in ten periods, then the total identification time is only forty milliseconds plus two transmission times ($2\Delta T$).

Throughout the above description of FIGS. 1-3, it was assumed that the signal propagation time $\Delta T_2$ from vehicle $V_1$ to vehicle $V_2$ as measured by the range finder circuit 10b had no inaccuracies, and it was assumed that the interrogate timing pulses I as generated by the I-slot generators 10c and 20c are in perfect synchronization. If, however, some inaccuracies are introduced by the range finder 10b and/or the I-slot generators 10c and 20c, then those inaccuracies will be compensated for by the preferred embodiment of the correlator 20i which is shown in FIG. 4.

This FIG. 4 correlator includes a sequential control circuit 40, a storage circuit 41, and an AND-INTEGRATE-COMPARE circuit 42. All of these circuits are interconnected as shown. In operation, the storage circuit 41 stores whatever signal is received via the antenna 20a during an extended I timing period $I_E$. Signal $I_E$ starts a few chip times before the normal I pulse and ends a few chip times after the normal I pulse. In FIG. 4, signal I is shown by voltage waveform 51, and signal $I_E$ is shown by waveform 52 as extending beyond signal I by two chip times.

By storing the received interrogator signals in the storage circuit 41 during the extended timing period $I_E$, the chip sequence $C_X$, $C_{X+11}$ ... will be captured even though it is received slightly out of sync with the I pulse. For example in FIG. 4, waveform 53 shows the case where the chip sequence $C_X$, $C_{X+1}$, ...is received one chip time early relative to the I pulse; and waveform 54 shows the case where the chip sequence $C_X$, $C_{X+1}$... is received ½ chip time late.

After the extended timing period $I_Z$, the sequential control circuit 40 sequentially generates five control signals R+1, R+½, R, R−½, and R−1. In response to signal R, storage circuit 41 reads out the set of signals that it stored during the period I; in response to signal R+½, storage circuit 41 reads out the set of signals that it stored during the period I delayed by ½ of a chip time period; in response to the signal R−½, the storage circuit 41 reads out the set of signals that it stored during the period I advanced by ½ of a chip period; etc.

Each set of signals which are read from the storage circuit 41 is sent to the AND-INTEGRATE-COMPARE circuit 42, and there they are correlated with the chip sequence $C_x$, $C_{x+1}$, ... from the code generator 20e. If any one of those correlations produces a MATCH signal, then that signal is sent to the transmitter 20f which sends a response to the interrogator as previously described.

One preferred embodiment of an electronic identification system that is constructed according to the invention has now been described in detail. In addition however, many changes and modifications can be made to these details without departing from the nature and spirit of the invention. For example, if less security can be tolerated, then the interrogator circuit 10 can continuously transmit the chip sequence $C_x$, $C_{x+1}$ delayed by $\Delta T_2$ (or $\Delta T_3$) in one frequency band, and the transponder 20 can transmit the response chip sequence in a different frequency band. Accordingly, it is to be understood that the invention is not limited to the details of the illustrated and described preferred embodiment but is defined by the appended claims.

What is claimed is:

1. An electronic identification system for use by vehicles on a battlefield, said system comprising:
    an interrogator circuit in one of said vehicles and a transponder circuit in the remaining vehicles;
    each of said interrogator and transponder circuits including a code generating means which generates the same sequence of chip signals and timing means which generate synchronized reference timing signals;
    said interrogator circuit further including —1) a range finding means which determines the propagation time for a radio signal to travel from said interrogator circuit to a selectable one of said remaining vehicles, and, 2) a transmitting means which transmits via radio said sequence of chip signals advanced in time relative to said reference timing signals by said propagation time;
    said transponder circuit further including—1) a correlator means for receiving the transmitted chip signals in synchronization with said reference timing signals and correlating same with said sequence of chip signals from its own code generating means, and 2) a response circuit for transmitting via radio a response only if the result of said correlating exceeds a certain threshold.

2. A system according to claim 1 wherein said transmitting means transmits said sequence of chip signals in several short spaced apart bursts, with each burst occurring in a respective one of several long consecutive time periods.

3. A system according to claim 2 wherein each of said bursts occupies less than ten percent of one of said time periods.

4. A system according to claim 3 wherein each of said bursts starts at a different time instant within its respective time period.

5. A system according to claim 4 wherein each of said bursts lies within a certain frequency band, and wherein said response by said transponder circuit is transmitted between said spaced apart bursts within the same frequency band.

6. A system according to claim 1 wherein said transmitting means transmits said sequence of chip signals as one continuous transmission.

7. An interrogator circuit, for use in identifying a potential target as being friendly or unfriendly, comprising:
- a code generating means which generates a sequence of chip signals;
- a range finding means which determines the propagation time for a radio signal to travel from said interrogator circuit to said potential target;
- a timing means which generates reference timing signals;
- a transmitting means which transmits via radio said sequence of chip signals advanced in time from said reference signals by said propagation time to said potential target.

8. An interrogator circuit according to claim 7 wherein said transmitting means transmits said sequence of chip signals in several short spaced apart bursts, with the start of each burst being advanced in time from a respective one of said reference signals by said propagation time to said potential target.

9. An interrogator circuit according to claim 8 wherein each of said bursts occurs in and occupies less than ten percent of a respective one of several consecutive time periods.

10. An interrogator circuit according to claim 9 wherein each of said bursts starts at a different time instant within its respective time period.

* * * * *